Jan. 20. 1925.

H. G. MUELLER

METHOD OF INTRODUCING LUBRICANTS TO PRESSURE CYLINDERS AND APPARATUS THEREFOR

Filed March 7, 1921 2 Sheets-Sheet 1

Inventor
Herman G. Mueller
By W. ?
Attorney

Patented Jan. 20, 1925.

1,523,605

UNITED STATES PATENT OFFICE.

HERMAN G. MUELLER, OF ERIE, PENNSYLVANIA, ASSIGNOR TO SKINNER ENGINE COMPANY, OF ERIE, PENNSYLVANIA, A CORPORATION OF PENNSYLVANIA.

METHOD OF INTRODUCING LUBRICANTS TO PRESSURE CYLINDERS AND APPARATUS THEREFOR.

Application filed March 7, 1921. Serial No. 450,232.

*To all whom it may concern:*

Be it known that I, HERMAN G. MUELLER, a citizen of the United States, residing at Erie, in the county of Erie and State of Pennsylvania, have invented new and useful Improvements in the Methods of Introducing Lubricants to Pressure Cylinders and Apparatus Therefor, of which the following is a specification.

This apparatus is designed to lubricate engines, or devices which involve a cylinder and a piston operating in the cylinder, the cylinder having portions at varying pressures. In carrying out the invention connection is made between parts of the cylinder having at times relatively high pressure with points in the cylinder having at the same moment relatively low pressure and utilizing the movement of fluid through this connection to introduce the lubricant. I have shown the invention applied to a steam engine and in an alternative construction to an internal combustion engine.

An apparatus for utilizing the method embodying the invention is illustrated in the following drawings wherein:—

Figure 1:
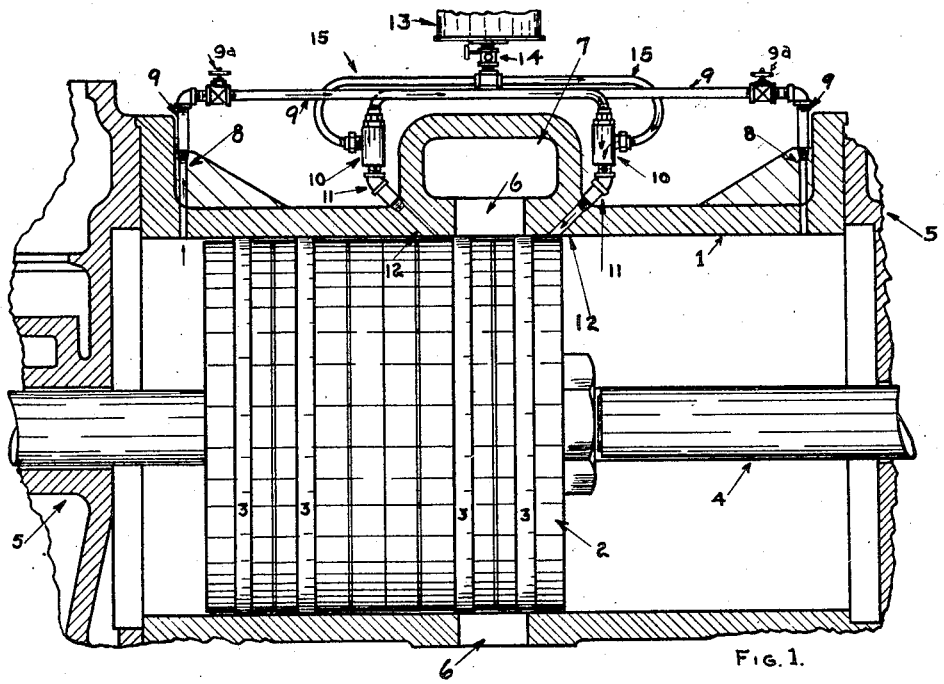

Fig. 1 shows a central longitudinal section of a Una-flow engine with the apparatus in place.

Figure 2:
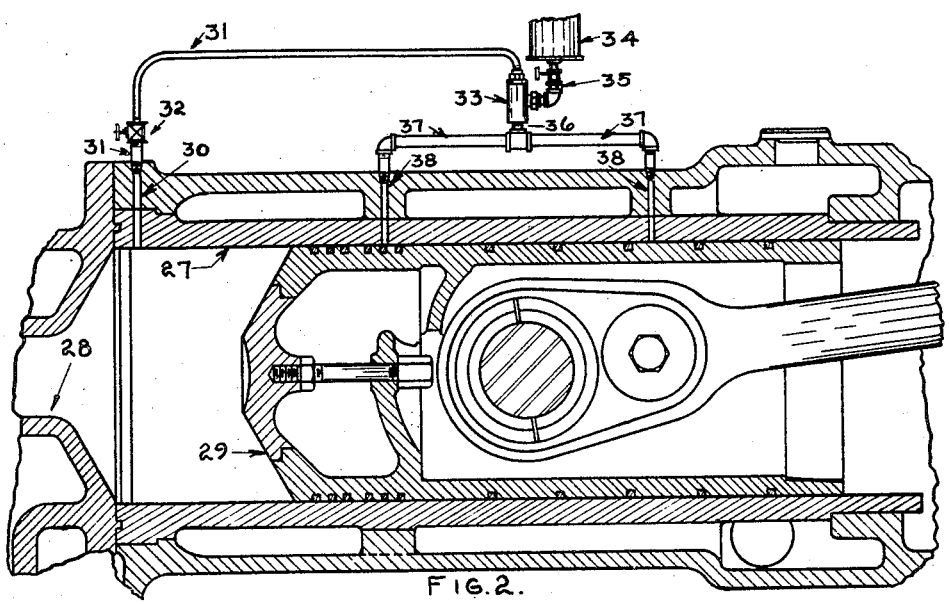

Fig. 2 a central section of an internal combustion engine cylinder with the apparatus in place.

Figure 3:
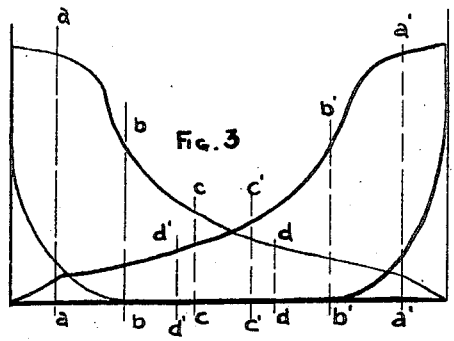

Fig. 3 a diagram showing variations in pressure in the Una-flow cylinder.

Figure 4:
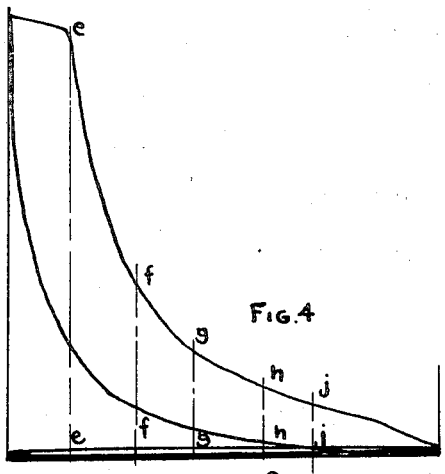

Fig. 4 a similar diagram of the pressures at different points of the cylinder in the internal combustion engine shown in Fig. 2.

Figure 5:
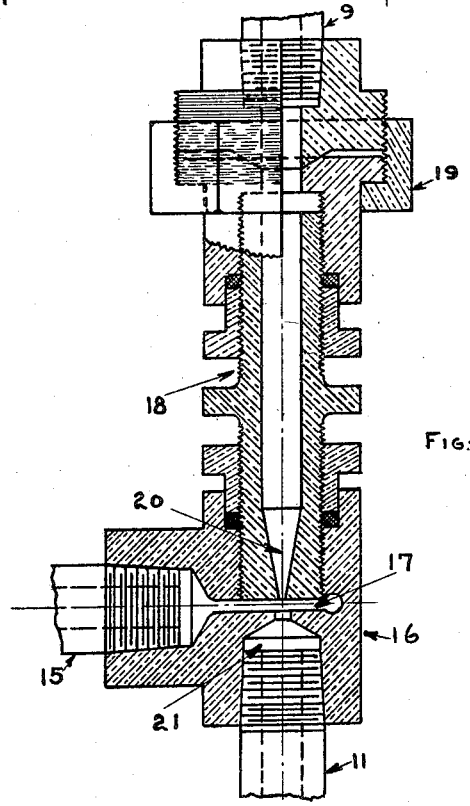

Fig. 5 a central section of a spraying device.

Figure 6:
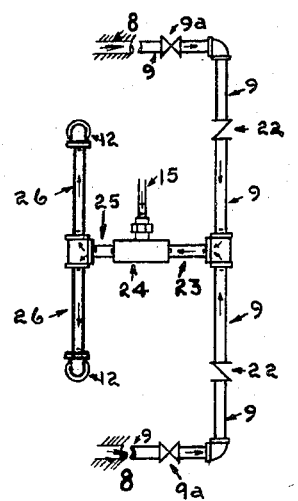

Fig. 6 an alternative construction of piping suitable for use with the engine shown in Fig. 1.

1 marks the steam engine cylinder, 2 the piston therein, 3 the piston rings on the piston, 4 the piston rod, 5 the cylinder head which is steam-heated and from which steam is introduced, 6 the exhaust ports, and 7 the exhaust passage, the engine shown being of the Una-flow type.

A passage or small port 8 leads from the pressure ends of the cylinder. A pipe 9 leads from the port 8 to a spraying device 10. A connection 11 leads from the spraying device to a port 12 leading through the cylinder adjacent to the exhaust, or at least in a part traversed by the piston.

A lubricating cup or tank 13 supplies lubricant through an adjustable sight fitting 14 to a pipe 15, the pipe 15 leading to the spray device. The spray device is of any desired construction having a spray fitting 16 with a small film chamber 17. The spray nozzle fitting 18 is connected by means of a union 19 with the pipe 9. The nozzle fitting has a nozzle 20 at right angles to the film chamber 17 and opposite the discharge opening 21, the discharge opening leading to the pipe 11. It will readily be seen that as the steam flows through the pipe 9 to the spray device it picks up a film of oil and sprays it on to the piston, the spraying action carrying it around the piston between the rings thoroughly lubricating the same.

In Fig. 3 I have shown diagrammatically the variations in pressure between the ports 8 and 12 of Fig. 1 with the piston in different positions. In this diagram the line *a—a* indicates the differences in pressure with the piston approximately at the port 8 in Fig. 1 and this variation steps down gradually to the differences represented by the lines *b—b*, *c—c* and *d—d*, the lines indicating points in the cylinder uncovered by the piston.

Opposite ends of the cylinder are similarly shown by lines *a'—a'*, *b'—b'*, *c'—c'* and *d'—d'*.

The pipes 9 may be closed or throttled by the valves 9ª if desired so that either end of the lubricating device may be used alone if desired, or so that throttling of blow pressure may be obtained if desired.

In Fig. 6 I show an alternative construction of piping. In this the ports 8 lead to the pipe 9, the pipe 9 in this case having the check valves 22. A pipe 23 leads from the pipe 9 to a spray device 24. A pipe 15 connects the spray device with the lubricating cup or adjustable sight feed and a pipe 25 leads from the spray device by way of the pipes 26 to the ports 12.

In Fig. 2 I have shown a Diesel type of engine provided with this device. In this construction 27 marks the cylinder, 28 the cylinder head, 29 the piston, 30 the lubricating port leading from the pressure end of the cylinder, 31 a pipe leading from said port, 32 a valve controlling the pipe 31, 33 a spray device, 34 a lubricating cup, 35 a pipe leading from the cup to the spray device, and 36 a pipe leading from the spray device by way of the pipes 37 to the ports 38 along points in the piston. This device works in the same manner as that formerly described. The variations in pressure at the ports 30 and 38 are indicated by the lines e—e, f—f, g—g, h—h, and j—j, these lines indicating relatively to the ends of the diagram the position of the piston in the cylinder.

What I claim as new is:—

1. In a lubricating apparatus, the combination of a cylinder; a piston in the cylinder; an open connection between a pressure end of the cylinder and a point along the piston; and a lubricant spraying device in the connection.

2. In a lubricating apparatus, the combination of a cylinder; a piston in the cylinder; connections leading from points nearer the ends of the cylinder to points nearer the center of the cylinder, and means for delivering lubricant to the connections in quantities insufficient to fill the connections.

3. In a lubricating apparatus, the combination of a cylinder; a piston in the cylinder; connections leading from the ends of the cylinder to points along the piston; and means for delivering a lubricant to said connections in quantities insufficient to fill the connections.

4. In a lubricating apparatus, the combination of a cylinder; a piston in the cylinder; connections leading from the ends of the cylinder to points along the piston; and means for delivering a lubricant to said connections, said means comprising a spraying device.

5. In a lubricating apparatus, the combination of a Una-flow engine cylinder; a piston in the cylinder; connections leading from the ends of the cylinder to points along the piston; and means for delivering lubricant to the connections in quantities insufficient to fill the connections.

In testimony whereof I have hereunto set my hand.

HERMAN G. MUELLER.